United States Patent [19]

Wright

[11] 4,109,732

[45] Aug. 29, 1978

[54] SOIL TILLING APPARATUS WITH PIVOTAL DRAW FRAME

[76] Inventor: Jesse F. Wright, Rte. 5, Box 284-X, Lufkin, Tex. 75901

[21] Appl. No.: 792,927

[22] Filed: May 2, 1977

[51] Int. Cl.² .................. B62D 51/06; A01B 69/00
[52] U.S. Cl. .................................. 172/258; 180/19 S
[58] Field of Search ................. 172/42, 256, 258; 180/19 R, 19 S, 19 H

[56] References Cited

U.S. PATENT DOCUMENTS 1,419,605  6/1922  Beeman ........................... 180/19 S

FOREIGN PATENT DOCUMENTS 536,956  2/1922  France ........................ 172/256
804,648  8/1936  France ........................ 172/42
688,756  3/1953  United Kingdom .......... 180/19 R Primary Examiner—Richard T. Stouffer
Attorney, Agent, or Firm—Vinson & Elkins

[57] ABSTRACT

A soil tilling apparatus having a traction wheel, an engine, the engine being connected to drive the traction wheel, a traction frame supported on the traction wheel and supporting the engine, a soil tilling tool, a draw frame on which the tool is mounted and hinges for pivotally mounting the draw frame to the traction frame.

4 Claims, 2 Drawing Figures

SOIL TILLING APPARATUS WITH PIVOTAL DRAW FRAME

BACKGROUND OF THE INVENTION

Soil tilling apparatus such as garden cultivators and plows have been used for a long time. With the wide use of small gasoline engines, such apparatus have used such engines. The prior structures have included a large drive wheel connected to the engine to be driven thereby and a frame supporting the engine from the drive wheel and the soil tilling tool.

Difficulties have been encountered with such prior apparatus as they were cumbersome and heavy to handle. Such devices have added outrigger wheels to assist in supporting the weight (H. Marcoux U.S. Pat. No. 3,168,148 and A. C. Johnson U.S. Pat. No. 2,457,821), have used two drive wheels with means for preventing one wheel from moving to assist in turning (G. E. Smithburn U.S. Pat. No. 2,824,506 and W. G. Hardy et al U.S. Pat. No. 2,626,671), have used widely spaced, separately powered drive wheels with outrigger rear wheels for weight distribution (F. V. Donald U.S. Pat. No. 1,768,673), and have placed the transmission over the drive wheel to increase traction and avoid counterbalancing (A. C. Johnson U.S. Pat. No. 2,457,821).

Such prior apparatus have not solved the turning problem to allow a soil tilling apparatus to reach substantially all of the ground in a garden plot while still providing a powerful apparatus which is easy to control and does an excellent job of soil tilling.

SUMMARY

The present invention relates to an improved power driven soil tilling apparatus which mounts one frame on the traction wheel with the engine and the steering handles on such frame and the soil tilling tool on a second frame which is pivotally mounted to the first frame.

An object of the present invention is to provide an improved power driven soil tilling apparatus which is easy to steer.

Another object is to provide an improved power driven soil tilling apparatus in which the traction wheel may be turned without lifting the soil tilling tool from its engagement in the ground.

A further object is to provide an improved power driven soil tilling apparatus with which its soil tilling tool may be held in the desired position with respect to the rows without slipping off to one side.

BRIEF DESCRIPTION OF THE DRAWINGS

These and other objects and advantages of the present invention are hereinafter set forth and explained with respect to the drawing wherein.

DESCRIPTION OF THE PREFERRED EMBODIMENT

Figure 1:
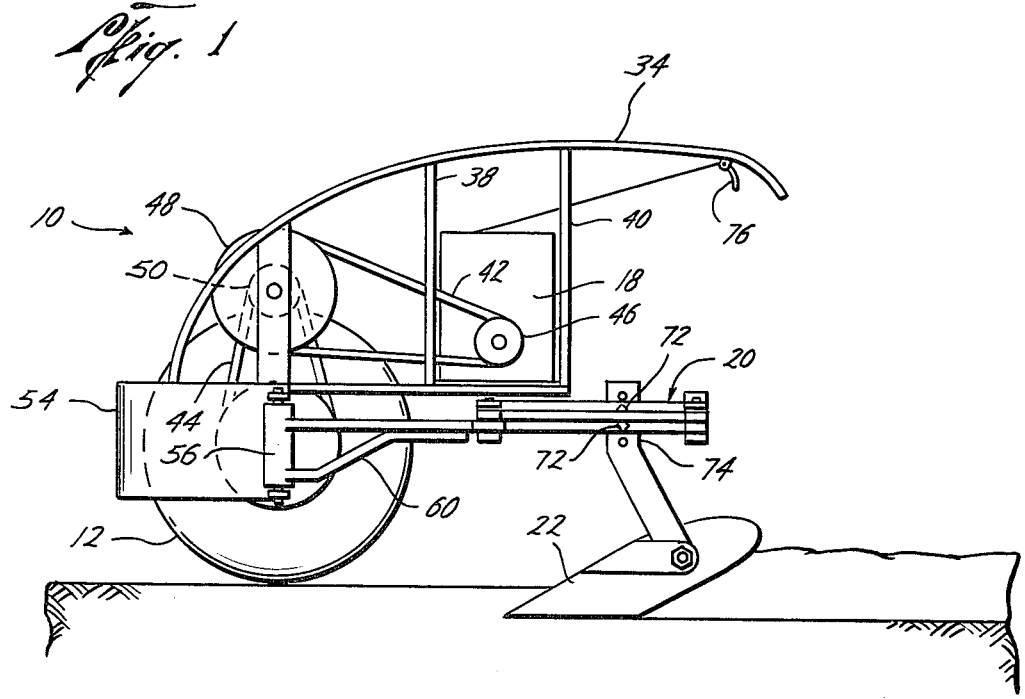
FIG. 1 is an elevation view of the improved soil tilling apparatus of the present invention.

The improved soil tilling apparatus 10 of the present invention includes the traction wheel 12 having an axle 14 which is mounted with suitable bearings to the traction frame 16, the engine 18, the draw frame 20 and the soil tilling tool 22 supported from the draw frame.

The traction frame 16 includes a rectangular base 24 formed by said axle 14, the side bars 26 and 28 and the transverse bars 30 and 32, and the steering arms 34 which are secured to the base 24 at 36 and are supported by the vertical columns 38 and 40. Suitable power transmission means for delivering engine power to rotate traction wheel 12 is provided and includes a clutch (not shown) together with belts 42 and 44 which engage pulleys 46 and 48 and pulleys 50 and 52, respectively. The arcuate wheel guard 54 forms a part of base 24 and extends around the front of wheel 12.

The draw frame 20 is connected to the traction frame 16 by the hinges 56. The draw frame 20 includes the arms 58 and 60 extending from the hinges 56 which are pivotally joined at their outer ends by the draw bar 62. The tool holder 64 is supported by pivotal connection to draw bar 62 and to the transverse bar 66 which is supported from the draw bar 62 by arms 68 and 70. All of the connection of bar 62, tool holder 64, bar 66 and arms 68 and 70 are pinned to form pivotal connections allowing free pivoting of draw frame 20 with respect to traction frame 16. The tool 22 is secured to the tool holder 64 by suitable means such as the bolts 72 passing through tool holder 64 and the shank 74 of tool 22.

The controls for the soil tilling apparatus are preferred to be located at the ends of arms 34 so that the person guiding the apparatus can also disengage the clutch and, if desired, engage a brake. Such controls may be a hand operated lever 76 mounted near the end of each of the arms 34.

Figure 2:
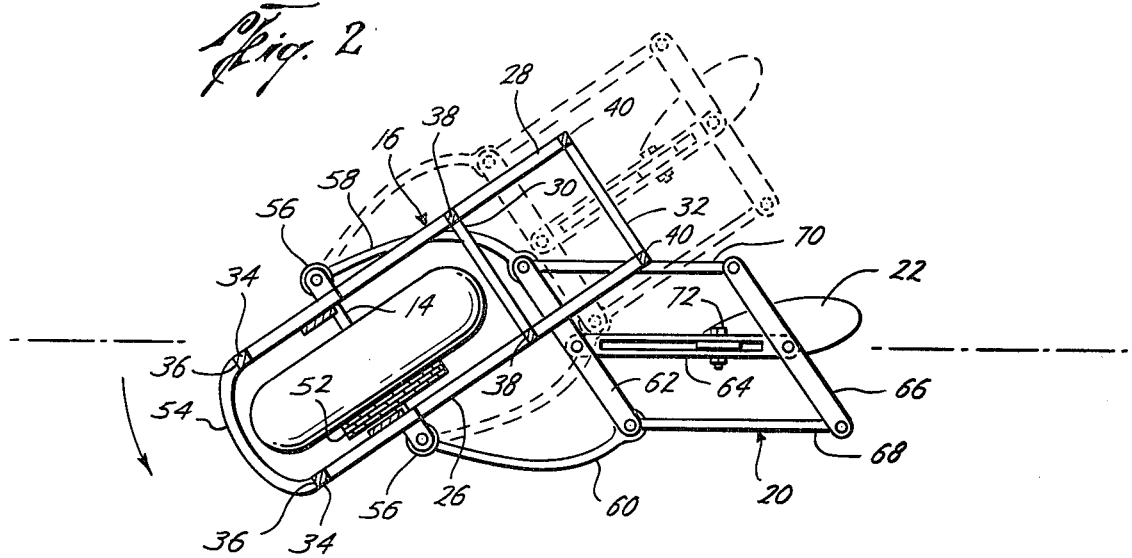
FIG. 2 is a plan view of the apparatus of the present invention illustrating the positions of the frames during turning in solid lines and the straight pulling position of the frames in dashed lines.

During normal operations the traction wheel 12 is rotated with sufficient power to pull the tool 22 through the ground. When the apparatus is to be turned, the arms 34 are moved in the opposite direction causing traction wheel 12 to pivot with respect to draw frame 20 and tool 22 to the position shown in FIG. 2. This causes the apparatus 10 to turn rapidly and without much effort on the part of the operator. With this improved apparatus the ground in a plot may be more completely tilled, straight rows can be maintained even if the traction wheel is riding a mound rather than the furrow in the rows.

If the connections between frames 16 and 20 are sufficiently loose, the weight of traction frame 16 may be rested on frame 20 whenever relative movement between the frames is not required. During such relative movement, such weight may be easily lifted by lifting the arms 34. However, it is preferred that the hinge connections be sufficiently tight so that the rear weight of frame 16 is supported at the hinge joint without the base 24 coming into contact with frame 20.

What is claimed is:

1. A soil tilling apparatus, comprising
   a traction wheel having an axle,
   a traction frame supported from said traction wheel,
   an engine mounted on said traction frame,
   means connecting said engine to drive said traction wheel,
   a draw frame including a longitudinally extending axis therethrough,
   a pair of first hinges, each of which is mounted at one end of said axle,
   a first arm and a second arm, each of which is pivotally mounted at one end thereof to one of said first hinges, a pair of second hinges, each of which is mounted to the other end of one of said first and second arms, a parallelogram linkage mounted on said pair of second hinges and pivotally connected thereby to said first and second arms, one link of said parallelogram linkage extending between said pair of second hinges, a second link of said parallelogram linkage opposite to said one link, said draw frame pivotally connected to said one link and said second link and extending therebetween, said longitudinal axis of said draw frame continuing to point toward said traction wheel as said draw frame pivots with respect to said traction frame.

2. A soil tilling apparatus according to claim 1, wherein said traction frame includes a base and a plurality of columns extending upwardly therefrom, and a pair of steering arms supported by said vertical columns from said base.

3. A soil tilling apparatus according to claim 2, including a hand-operated control for said apparatus positioned near the end of one of said steering arms.

4. A soil tilling apparatus according to claim 1 including a soil tilling tool mounted to said draw frame so that it moves only with the movement of said draw frame.

* * * * *